(12) United States Patent
Allen et al.

(10) Patent No.: US 10,257,191 B2
(45) Date of Patent: *Apr. 9, 2019

(54) BIOMETRIC IDENTITY VERIFICATION

(71) Applicant: NOTTINGHAM TRENT UNIVERSITY, Nottingham (GB)

(72) Inventors: Tony John Allen, Nottingham (GB); Sergio Grau Puerto, Oxford (GB)

(73) Assignee: Nottingham Trent University, Nottingham (GB)

( * ) Notice: Subject to any disclaimer, the term of this patent is extended or adjusted under 35 U.S.C. 154(b) by 101 days.

This patent is subject to a terminal disclaimer.

(21) Appl. No.: 15/083,855

(22) Filed: Mar. 29, 2016

(65) Prior Publication Data

US 2016/0285866 A1 Sep. 29, 2016

Related U.S. Application Data

(63) Continuation-in-part of application No. 13/130,798, filed as application No. PCT/GB2009/002769 on Nov. 27, 2009, now Pat. No. 9,311,546.

(30) Foreign Application Priority Data

Nov. 28, 2008 (GB) .................................. 0821766.3

(51) Int. Cl.
*H04L 29/06* (2006.01)
*H04W 12/06* (2009.01)
(Continued)

(52) U.S. Cl.
CPC .......... *H04L 63/0861* (2013.01); *G06F 21/32* (2013.01); *G06F 21/602* (2013.01);
(Continued)

(58) Field of Classification Search
CPC ... H04L 63/0861; G06F 21/32; G06F 21/602; G06N 3/08; H04W 12/06
See application file for complete search history.

(56) References Cited

U.S. PATENT DOCUMENTS 5,023,901 A 6/1991 Sloan et al.
5,053,608 A 10/1991 Sennanayake
(Continued)

FOREIGN PATENT DOCUMENTS

EP 0836720 A1 4/1998
EP 1096474 A2 5/2001
(Continued)

OTHER PUBLICATIONS

Mak et al.; Speaker identification using multilayer perceptrons and radial basis function networks; Elsevier; vol. 6; No. 1; pp. 99-117; Feb. 1994.
(Continued)

*Primary Examiner* — Tri M Hoang
(74) *Attorney, Agent, or Firm* — Shay Glenn LLP

(57) ABSTRACT

Methods and apparatuses for providing biometric authentication of a test user using a registration process where a reference data sample representative of one or more biometric attributes of a reference user is used to train a plurality of neural networks to achieve a target output. The weights that achieve this in the plurality of neural networks may be stored on a user device as a first data set. A second data set representative of one or more biometric attributes may be obtained from the test user using the authentication device or received from the user device. The first data set may be received by the authentication device and used as weights in an artificial neural network and the second data set may be used as inputs. The output of the neural network (Continued)

may determine a degree of correlation between the reference user and the test user to be authenticated.

29 Claims, 3 Drawing Sheets

(51) Int. Cl.
  *G06N 3/08* (2006.01)
  *G06F 21/60* (2013.01)
  *G06F 21/32* (2013.01)
  *H04W 88/02* (2009.01)

(52) U.S. Cl.
  CPC .............. *G06N 3/08* (2013.01); *H04W 12/06* (2013.01); *H04W 88/02* (2013.01)

(56) References Cited

U.S. PATENT DOCUMENTS

| | | | |
|---|---|---|---|
| 5,481,265 | A | 1/1996 | Russell |
| 5,583,961 | A | 12/1996 | Pawlewski et al. |
| 5,583,968 | A | 12/1996 | Trompf |
| 5,687,287 | A | 11/1997 | Gandhi et al. |
| 5,699,449 | A | 12/1997 | Javidi |
| 5,729,220 | A | 3/1998 | Russell |
| 5,806,040 | A | 9/1998 | Vensko |
| 6,128,398 | A | 10/2000 | Kuperstein et al. |
| 6,201,484 | B1 | 3/2001 | Russell |
| 6,411,930 | B1 | 6/2002 | Burges |
| 6,441,770 | B2 | 8/2002 | Russell |
| 6,519,561 | B1 | 2/2003 | Farrell et al. |
| D511,113 | S | 11/2005 | Feldman et al. |
| D511,114 | S | 11/2005 | Feldman et al. |
| 7,386,448 | B1 | 6/2008 | Poss et al. |
| 7,620,818 | B2 * | 11/2009 | Vetro .................... H04L 9/3231 382/115 |
| 7,627,475 | B2 | 12/2009 | Petrushin |
| 7,779,268 | B2 * | 8/2010 | Draper ............... G06K 9/00073 713/168 |
| 8,375,218 | B2 * | 2/2013 | Yedidia .............. G06K 9/00073 709/248 |
| 8,401,245 | B2 * | 3/2013 | Hashimoto ........ G07C 9/00563 340/5.52 |
| 9,311,546 | B2 | 4/2016 | Puerto et al. |
| 2001/0056349 | A1 | 12/2001 | St. John |
| 2004/0151347 | A1 | 8/2004 | Wisniewski |
| 2005/0038647 | A1 | 2/2005 | Baker |
| 2005/0129189 | A1 | 6/2005 | Creamer et al. |
| 2005/0138394 | A1 | 6/2005 | Poinsenet et al. |
| 2005/0188213 | A1 | 8/2005 | Xu |
| 2005/0281439 | A1 | 12/2005 | Lange |
| 2005/0286761 | A1 | 12/2005 | Xu |
| 2006/0013445 | A1 | 1/2006 | Lange |
| 2006/0136744 | A1 | 6/2006 | Lange |
| 2006/0224899 | A1 | 10/2006 | Haala |
| 2007/0255564 | A1 | 11/2007 | Yee et al. |
| 2008/0104415 | A1 | 5/2008 | Palti-Wasserman et al. |
| 2009/0287489 | A1 | 11/2009 | Savant |

FOREIGN PATENT DOCUMENTS

| | | | |
|---|---|---|---|
| EP | 1531459 | A1 | 5/2005 |
| EP | 1915294 | A2 | 4/2008 |
| FR | 2817425 | A1 | 5/2002 |
| FR | 2864289 | A1 | 6/2005 |
| NZ | 539208 | A | 10/2007 |
| WO | WO95/05656 | A1 | 2/1995 |
| WO | WO99/23643 | A1 | 5/1999 |
| WO | WO01/27723 | A1 | 4/2001 |
| WO | WO02/29785 | A1 | 4/2002 |
| WO | WO03/038557 | A2 | 5/2003 |
| WO | WO2004/012388 | A1 | 2/2004 |
| WO | WO2004/100083 | A1 | 11/2004 |
| WO | WO2004/112001 | A1 | 12/2004 |
| WO | WO2005/055200 | A1 | 6/2005 |
| WO | WO2005/122462 | A1 | 12/2005 |
| WO | WO2006/014205 | A2 | 2/2006 |
| WO | WO2006/048701 | A2 | 5/2006 |
| WO | WO2006/059190 | A2 | 6/2006 |
| WO | WO2006/061833 | A2 | 6/2006 |
| WO | WO2007/060360 | A1 | 5/2007 |
| WO | WO2007/079359 | A2 | 7/2007 |
| WO | WO2009/124562 | A1 | 10/2009 |
| WO | WO2010/047816 | A1 | 4/2010 |

OTHER PUBLICATIONS

Farrell et al.; Speaker recognition using neural networks and conventional classifiers; IEEE trans.; vol. 2; No. 1; pp. 194-205; Jan. 1994.

Jain et al.; Handbook of Biometrics; Springer, New York; Chapter 8; Chapter 19; Aug. 2008.

Bielby et al.; Speaker verification with sequential decision on a speaker specific vocabulary; Eur. Conf. on Speech Tech.; Edinburgh, Scotland; 1 page; Sep. 1987.

Biometric Security Template Storage; retrieved from internet http://www.andrewpatrick.ca/biometrics/tempiates/template.shtml on May 10, 2018; 2 pages; (year of pub. sufficiently earlier than effective US filing date and any foreign priority date) 2004.

Hussain et al.; Improved speaker verification system with limited training data on telephone quality speech; 5th Eur. Conf. on Speech Comm. and Tech.; Rhoads, Greece; 4 pages; Sep. 22-25, 1997.

Jain et al.; Biometrics Personal Identification in Networked Society; Kluwer Academic Publ. Group; excerpt from book; 5 pages; (year of pub sufficiently earlier than effective US filing date and any foreign priority date) 1999.

Oglesby et al.; Radial Basis Function Networks for Speaker Recognition; Toronto, Intl. Conf. on Acoustics, Speech and Signal Proc.; pp. 393-396; Apr. 14, 1991.

Shrimpton et al.; Comparison of recurrent neural network architectures for speaker verification; Proc. of the Fourth Aus. Intl. Conf. on Speech Sci. and Tech.; pp. 460-464; (year of pub sufficiently earlier than effective US filing date and any foreign priority date) 1992.

* cited by examiner

BIOMETRIC IDENTITY VERIFICATION

CROSS REFERENCE TO RELATED APPLICATIONS

This patent application claims priority as a continuation-in-part of U.S. patent application Ser. No. 13/130,798, titled "BIOMETRIC IDENTITY VERIFICATION", filed on Aug. 11, 2011, now U.S. Pat. No. 9,311,546, which claims priority under 35 U.S.C. § 371 to PCT Application No. PCT/GB 2009/002769, titled "BIOMETRIC IDENTITY VERIFICATION", filed on Nov. 27, 2009, which claims priority to GB Application No. 0821766.3, filed on Nov. 28, 2008. Each of these patent applications is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The present invention relates to methods and apparatus (e.g., devices and systems) for providing secure biometric authentication of individuals attempting to gain access to an electronically controlled resource. The resource to which the individuals are attempting to gain access could be, for example, a computer system. The expression "gain access to" is intended to encompass actions such as: authenticating a transaction on a network, such as a financial transaction or a login transaction; authorizing or initiating a transaction or other event on a computer system or network; and physically accessing a building or other restricted area.

BACKGROUND

There are numerous systems in the prior art which provide biometric authentication of an individual. These systems generally require that a user is first registered or enrolled by providing their biometric identification information to a central or remote database resource. Corresponding biometric information is subsequently gathered in real time from a user at a point of access, such as an immigration desk, a building entry system or a computer login facility. The central database of biometric information is generally remote from the points of access. Before a user is allowed access to the resource, the biometric information gathered at the point of access in real time is compared with the central or remote database and a decision is then made whether the user presenting at the point of access corresponds with a registered user.

There are a number of potential disadvantages with such a system.

The implementation of a central database requires real time communication with that database for every point of access, in order to authenticate users presenting themselves at the points of access. If there are many points of access, this necessitates an extensive communication infrastructure. The implementation of a central database also requires that users are happy to have their biometric information stored remotely by a third party, which may not always be the case. The use of a remote database also means that the user's biometric information must be transmitted over the communication infrastructure for every authentication event so that comparison can take place, either at the point of access or at the central database. In other words, for the comparison between a registered user's biometric information and that gathered in real time for a user under test, either the centrally held registration record must be transferred to the point of access, or the real time gathered information from the point of access must be transferred to the central database. In either case, transferring such information over communication networks, and in particular over long distance communication networks, provides an additional security risk and/or an encryption and decryption overhead. Finally, centrally stored biometric data can only be accessed from the service provider with whom the user enrolled. Users must therefore provide their biometric profiles separately to every service provider who wishes to use such biometric identity verification to validate user access.

The apparatuses (which may include devices and systems including such devices) described herein may overcome or mitigate some or all of the problems identified above for traditional biometric systems.

SUMMARY OF THE DISCLOSURE

Described herein are methods of biometric authentication of a test user using an authentication device, as well as apparatuses including authentication devices that may performs some or all of the methods descried herein.

For example, described herein are methods of biometric authentication of a test user in an authentication device. Any of these methods may include: obtaining in the authentication device, at a time of authentication, a test sample data set representative of one or more biometric attributes of the test user, wherein prior to the time of authentication the authentication device includes a plurality of untrained artificial neural networks; receiving in the authentication device a first data set from the user device at the time of authentication, wherein the first data set is derived from one or more biometric attributes of a reference user and is stored in the user device, further wherein the first data set comprises multiple weight sets with each weight set corresponding to a respective neural network and each weight set corresponding to one element of the one or more biometric attributes; using the first data set as a set of weights for the untrained neural networks in the authentication device to generate trained neural networks at the time of authentication; providing the test sample data set as inputs to the trained neural networks; and determining, from outputs of the trained neural networks corresponding to the inputs, a degree of correlation between the one or more biometric attributes of the reference user and the one or more biometric attributes of the test user.

As used herein, obtaining in the authentication device, at a time of authentication, a test sample data set may include receiving test sample data set from a user device (e.g., phone) and/or the authentication device collecting the test sample date from the test user. For example, in some variations a user device such as a smartphone is used to collect the biometric sample. The user device may then pass the test sample data set to the authentication device, at the time of authentication, along with the first data set. For example, a smartphone including one or more microphones, cameras and/or fingerprint scanners. These sensors may allow the authentication device to receive this information without requiring additional biometric input sensor(s) on the authentication device.

The user device may be a mobile device and/or the authentication device may be a mobile device. For example, the user device may be a mobile telephone (e.g., smartphone, cell phone, etc.), a wearable electronics device (e.g., Fitbit, iWatch, Google glass, Bluetooth enabled dog tags, or the like). The first data set may be stored on these wearable technology devices and transferred to the authentication device (e.g., a mobile phone configured as an authentication device) at the time of authentication.

In some variations, the authentication device is a mobile phone, or is included as part of a mobile phone. Thus, a portable/wearable electronics device may be configured by software, firmware, hardware or some combination thereof to perform any of the steps described herein. Thus, in some variations, a secured resource that is accessed using the authentication device (the second device) may be a secure memory area on the phone itself or a secure server remotely accessed from the phone.

For example, the user device may be a portable user device and the authentication device may be coupled to an electronically controlled resource to which the test user may be granted or refused access on the basis of the degree of correlation determined, e.g., a door entry system.

The first data set may include sets of neural network weights adapted to cause a respective one of the neural networks to provide a first target output when the respective network is presented with an input representative of the one or more biometric attributes of the reference user and adapted to provide a second target output different from the first target output when the network is presented with an input representative of the one or more biometric attributes of a user other than the reference user.

In any of these methods and apparatuses described herein, the first data set stored on the user device may be encrypted, and using the first data set may include decrypting the first data set prior to using it. Any appropriate encryption may be used, including encoding, public key encryption, symmetric key encryption, etc.

For example, described herein are methods of biometric authentication of a test user in an authentication device including: obtaining in the authentication device, at a time of authentication, a test sample data set representative of one or more biometric attributes of the test user, wherein prior to the time of authentication the authentication device includes a plurality of untrained artificial neural networks; receiving in the authentication device an encrypted first data set from the user device at the time of authentication, wherein the first data set is derived from one or more biometric attributes of a reference user and is stored in the user device, further wherein the first data set comprises multiple weight sets with each weight set corresponding to a respective neural network and each weight set corresponding to one element of the biometric attribute; decrypting the first data set and using the decrypted first data set as a set of weights for the untrained neural networks in the authentication device to generate trained neural networks at the time of authentication; inputting the test sample data set as inputs to the trained neural networks; and determining, from outputs of the trained neural networks' corresponding to the inputs, a degree of correlation between the biometric attribute of the reference user and the one or more biometric attributes of the test user.

Any of the methods described herein may include generating the first data set and/or storing the first data set in the user device (e.g., phone, wearable electronics, etc.). Thus, any of these methods may include obtaining the test sample data set such as: obtaining a biometric input from the test user; determining a plurality of component vectors of the biometric input; and using the plurality of component vectors as the test sample data set.

In general, the methods described herein may be applied using one or more of any appropriate biometric attribute. For example the one or more biometric attributes may be one or more of: a voice print of the test user, a fingerprint of the test user, an image of the test user, etc. In some variations, multiple biometric attributes may be used to generate the first and second data sets (e.g., the first data set and the test sample data set). For example, the methods and apparatuses described herein that typically use multiple separable neural networks may use multiple elements from any single biometric modality, i.e. multiple fingerprints, multiple user images (e.g., face images from different orientations/lighting, eye/retinal images from different orientations/lighting, etc.), multiple voice prints, or any combination of biometric modalities (voice and fingerprint, etc.) Thus, the one or more biometric attributes may comprise two or more of: a voice print of the test user, a fingerprint of the test user, an image of the test user, etc. The test sample data and the first data set may be matched, so that the same biometric attributes are used to collect both (e.g., voiceprint, fingerprint, face image, etc.).

Obtaining the test sample data set may include: obtaining one or more of a speech input from the test user, a fingerprint from the test user, and an image of the test user; determining a plurality of component vectors from the obtained one or more of the speech input from the test user, fingerprint from the test user, and image of the test user; and using the plurality of component vectors as the test sample data set.

In general, determining a degree of correlation may include authenticating the test user as the reference user if the average, or weighted average, of the trained neural network outputs reaches a predetermined threshold level. For example, determining a degree of correlation may include authenticating the test user as the reference user if each trained neural network output reaches a predetermined threshold level.

Any of these methods may also include registering the reference user by obtaining a reference data sample representative of the one or more biometric attributes of the reference user, obtaining a differentiating data sample representative of the one or more biometric attributes of one or more persons different from the reference user, using the reference data sample to generate a set of positive training pattern inputs to reference neural networks to achieve a first target output, using the differentiating data sample to generate a set of negative training pattern inputs to the reference neural networks to achieve a second target output; and determining the first data set as the sets of weights from the reference neural networks that achieve the first and second target outputs.

A method of biometric authentication of a user may include the steps of: storing, in a first device, a first data set derived from a biometric attribute of a reference user; obtaining, by a second device, a second data set representative of the biometric attribute of a test user to be authenticated; using the first data set as a set of parameters of a statistical classifier to generate a trained statistical classifier; providing the second data set as input to the trained classifier; and determining, from the trained classifier output corresponding to said input, a degree of correlation between the biometric attribute of the reference user and the biometric attribute of the test user to be authenticated.

Also described herein are authentication devices for providing biometric authentication of a test user at a time of authentication. These devices (or systems including these devices) may perform any of the methods described herein. For example, an authentication device may include: a first input configured to receive, at the time of authentication, a first data set from a user device that is separable from the authentication device, the first data set derived from a biometric attribute of a reference user, wherein the first data set comprises multiple weight sets with each weight set corresponding to a respective neural network and each weight set corresponding to one element of the biometric attribute; a second input configured to receive, at the time of authentication, a test sample data set representative of the biometric attribute of the test user; a processor configured as a plurality of untrained artificial neural networks, the processor adapted to receive the first data set and program the untrained neural networks with the first data set as a set of weights for the untrained neural networks to generate trained neural networks; the processor being further adapted to receive the test sample data set as input to the trained neural networks from the second input; and a decision processor adapted to determine, from the outputs of the trained neural networks corresponding to the input, a degree of correlation between the biometric attribute of the reference user and the biometric attribute of the test user.

The first input may be any appropriate input, and may be used to receive digital and/or analog data. For example, when the apparatus (e.g., the authentication device) is configured as a smartphone the input may be wired or wireless (e.g., Bluetooth, WiFi, NFC, RFID, etc.). The input may be a plug or connector for physically connecting to the user device. The second input may be an input or inputs adapted to receive and/or process the biometric modality used (e.g., a voice recorder, camera, fingerprint sensor, etc.). Alternatively, the second input may receive information processed by these biometric modality processors and may be a wired or wireless input, and may include circuitry configured to receive these inputs. For example, when the authentication device is a mobile device (e.g., smartphone, etc.) configured to operate as an authentication device, the second input may be a software, firmware and/or hardware input (e.g., register, memory, buffer, etc.) that receives the test sample data set. As used herein a processor may include any appropriate processor, including general-purpose and specialized and/or programmable processors (e.g., ASIC). One or more processors may be included. A processor may include a plurality of processors, which may be separate or connected. For example, each processor could be implemented as a dedicated neural network, with one for each network in the specified plurality of neural networks. A separate generic processor may be included to act as the decision processor. In some variations a single processor may operate as both the processor including the untrained artificial neural networks (and subsequently trained neural networks) and as the decision processor; alternatively separate but connected processors may be used.

In general, the first data set may comprise a set of neural network weights adapted to cause a respective one of the neural networks to provide a first target output when the respective network is presented with an input representative of the biometric attribute of the reference user and adapted to provide a second target output different from the first target output when the network is presented with an input representative of the biometric attribute of a user other than the reference user.

As mentioned, any of these apparatuses may use one or more biometric attributes (e.g., one or more of: a voice print of the test user, a fingerprint of the test user, an image of the test user, including a face image). For example, a biometric attribute may be a voice print of a test user and the second input may be a voice recorder configured to obtaining a speech input from the test user; further wherein the second input may comprise a processor configured to determine a number of component vectors of the speech input and providing the component vectors as the second data set.

The decision processor may be adapted to authenticate the test user as the reference user if the average (or weighted average) of the trained neural networks outputs reaches a predetermined threshold level. For example, the decision processor may be adapted to authenticate the test user as the reference user if each trained neural network output reaches a predetermined threshold level.

As mentioned, in any of the authentication devices described herein, the authentication device may include a voice recorder, a fingerprint scanner and/or a camera. In some variations, the authentication device includes a registration apparatus for registering the reference user, comprising: a registration input configured to obtain a reference data sample representative of the biometric attribute of the reference user; a processor adapted to obtain a differentiating data sample representative of the biometric attribute of one or more persons different from the reference user; wherein the processor is adapted to use the reference data sample to generate a set of positive training pattern inputs to reference neural networks to achieve a first target output; further wherein the processor is adapted to use the differentiating data sample to generate a set of negative training pattern inputs to the reference neural networks to achieve a second target output; and wherein the processor is adapted to determine the first data set as the sets of weights from the reference neural networks that achieve the first and second target outputs. Alternatively or additionally, the authentication devices described herein may communicate directly or indirectly with a remote server that performs the registration process (e.g., as a separate process). For example, a user device may be used to record reference biometric samples which may then be sent to the remote server. At the server, the user reference samples may be used, along with a set of differentiating data samples from other persons, to train the neural networks. The unique first data set thus produced may then be installed on the user device either by wired or wirelessly (e.g., via WiFi, 3G/4G, etc.).

Any of these authentication devices may include or be coupled with an electronically controlled resource coupled/ connected to the decision processor, wherein the test user may be granted or refused access to the electronically controlled resource based on the degree of correlation determined by the decision processor.

An apparatus for providing biometric authentication of a user may include: first input means for receiving a first data set derived from a biometric attribute of a reference user; second input means for receiving a second data set representative of the biometric attribute of a test user to be authenticated; a processor configured as a statistical classifier, the processor adapted to receive the first data set and program the statistical classifier with said first data set as a set of parameters in the classifier to generate a trained classifier; the processor being further adapted to receive the second data set as input to the trained classifier; and means for determining, from the trained classifier output corresponding to said input, a degree of correlation between the biometric attribute of the reference user and the biometric attribute of the test user to be authenticated.

The statistical classifier may be an artificial neural network and the parameters of the statistical classifier correspond to weights in the artificial neural network.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
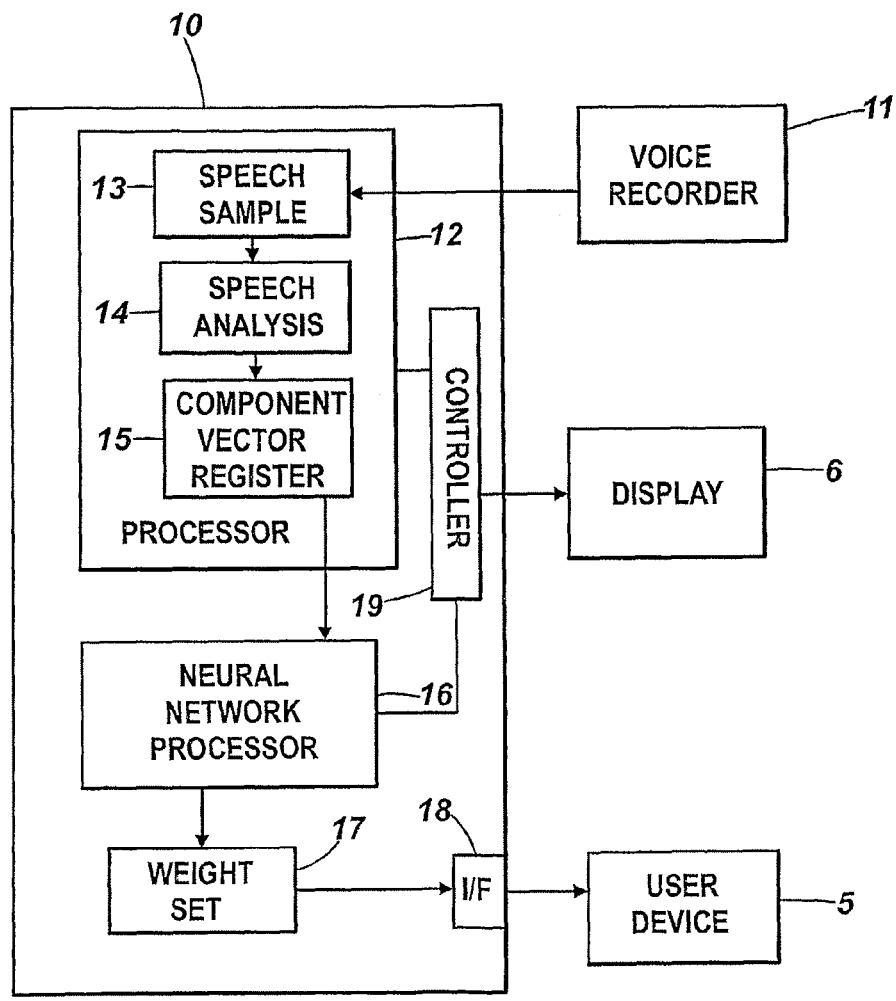
FIG. 1 shows a schematic block diagram of apparatus for registering a user's biometric information.

FIG. 1 shows a schematic functional block diagram of apparatus for registering biometric information of users. In the illustrated example, the biometric information registered is a voice print of the user. However, it will be understood that other biometric information could be registered instead or as well with suitable modifications of the apparatus 10.

The registration apparatus 10 comprises a voice recording device 11 which gathers speech samples from a user. The voice recorder 11 is coupled to a processing module 12 which includes a register 13 for storing recorded speech samples from the voice recorder, an analysis module 14 for analyzing the stored speech samples, and a register 15 for storing/forwarding component vectors from the analyzed speech.

The registration apparatus 10 also includes a processor 16 configurable as an artificial neural network and a further register 17 for storing/transferring weight sets determined by the neural network 16. Alternatively, other statistical classifiers could be incorporated instead of, or as well as, the artificial neural network with suitable modification of the registration apparatus 10. An interface 18 is provided for communication with a user device 5. The interface 18 may include a wired physical connection such as a USB socket or smart card chip connector. The interface 18 may alternatively or in addition include a wireless connection such as a Bluetooth, RFID, infra-red, 3G/4G, WiFi transmitter and receiver, etc. The interface 18 may include any other digital information transfer mechanism, e.g. one using induction or magnetic information transfer such as a magnetic card reader/writer.

The user device 5 may be any suitable portable data storage device. Exemplary devices include smart cards, memory sticks or memory cards, and portable computing devices such as PDAs or mobile telephones.

In one example, of a system and method as described herein, the user device (carrying the first data set) may be a smart card or wearable technology device that is capable of wireless connection to a mobile phone acting as the authentication device. The first data set may be transferred from the user device to the mobile phone (authentication device) at the time of authentication. The mobile phone (authentication device) may then record the test user, configure the multiple neural networks using the first data set, and perform the user authentication process. If successful, then the mobile phone may provide access to one or more secure resources such as protected data/memory areas on the phone or secure websites accessed via the phone.

In another example, the first device (user device) may be a mobile phone which may carry the first data set and the authentication device may be a dedicated device such as a door entry unit. If the secure resource is, for example, a door, the phone could act as the carrier of the first data set, which it wirelessly pushes to the door entry unit (authentication device), at the time of authentication. The door entry unit may contain the biometric detector (microphone, fingerprint sensor, camera etc.) and may perform the user authentication. If the authentication was successful the door would then be unlocked.

The registration apparatus 10 also may include a controller 19 for controlling and coordinating the various functional blocks of the registration apparatus 10 and an information display 6 for providing instructions to a user.

Figure 3:
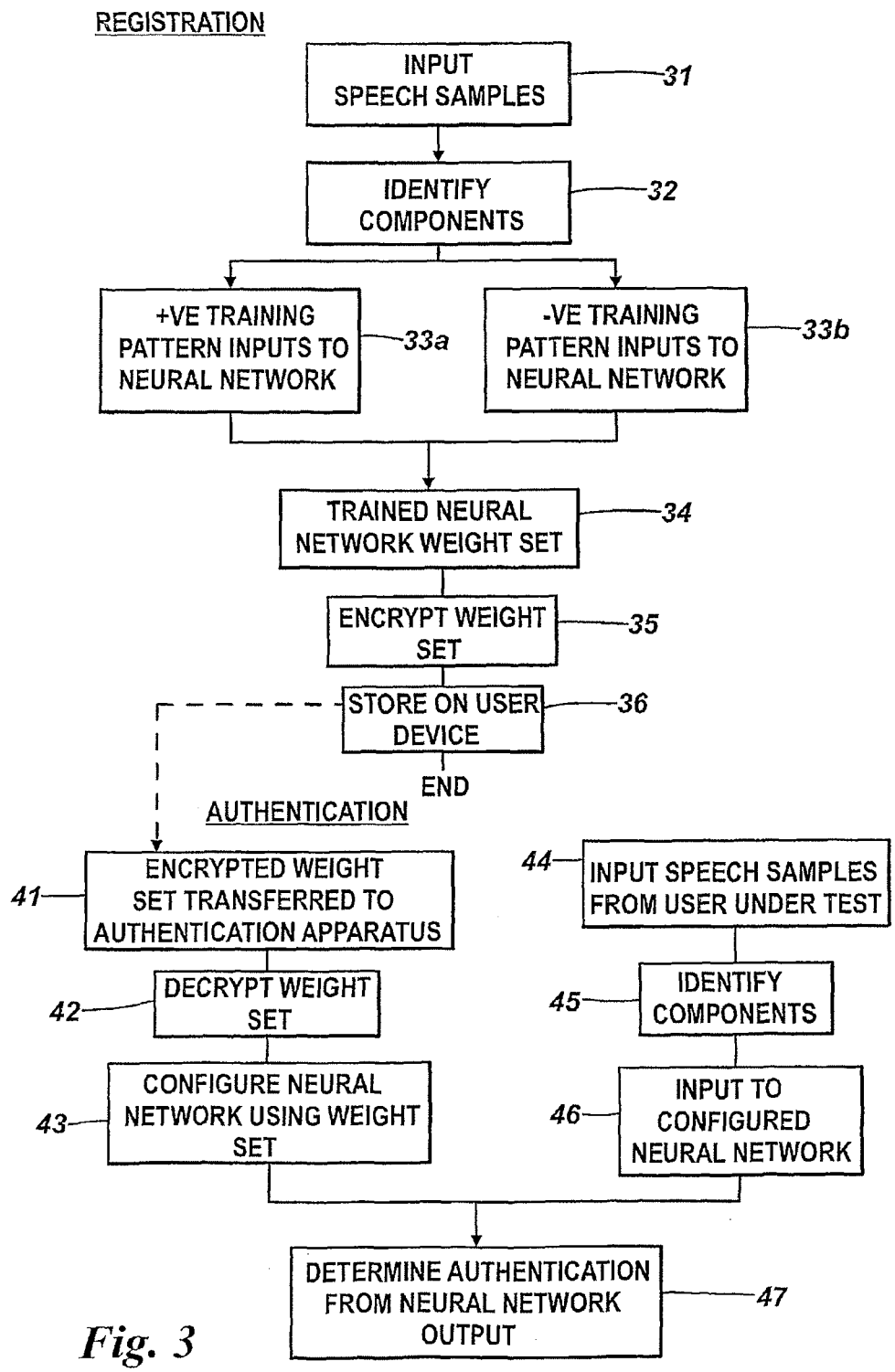
FIG. 3 is a flowchart indicating the steps of registering a user's biometric information and subsequently authenticating a user with the registered biometric information.

An exemplary operation of the registration apparatus will be described later with reference to FIG. 3.

Figure 2:
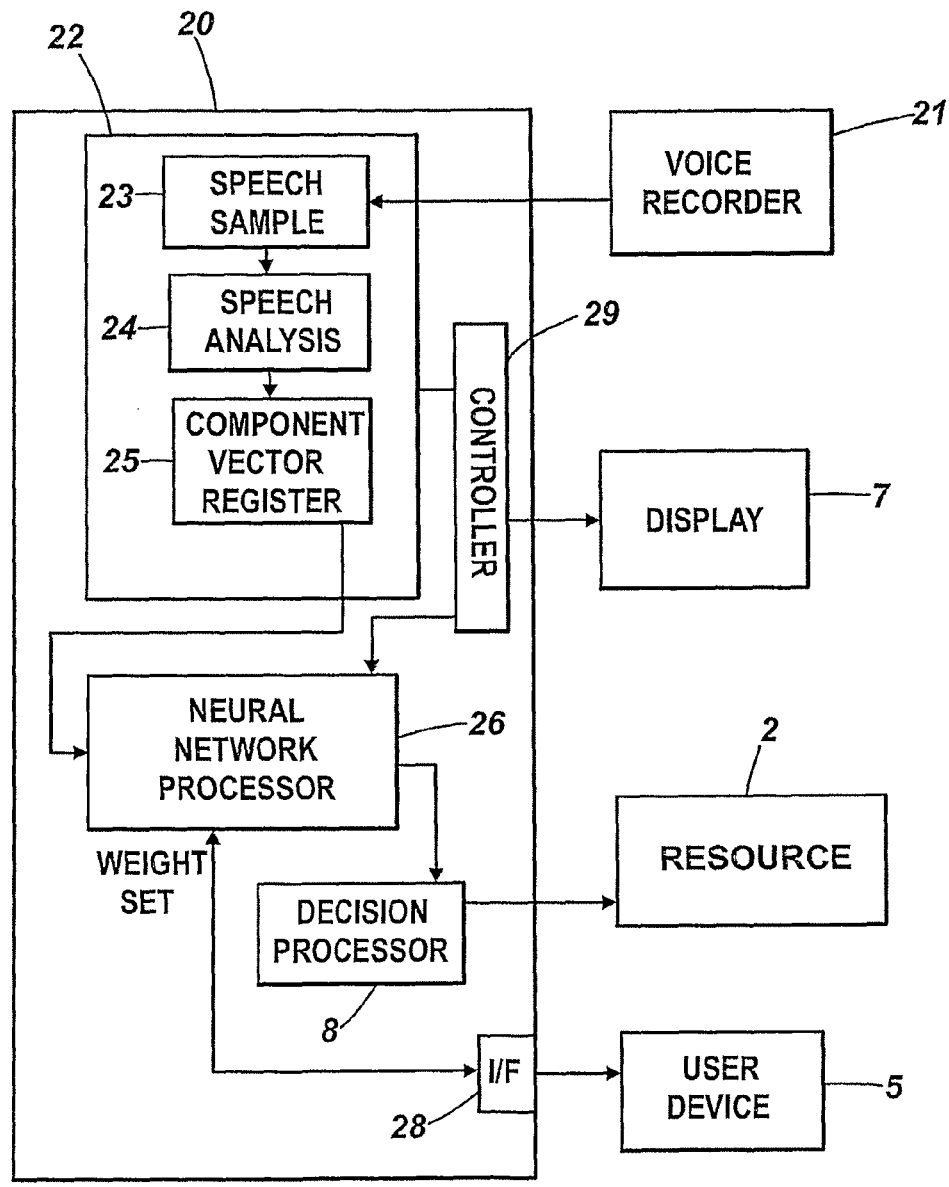
FIG. 2 shows a schematic block diagram of apparatus for using a set of biometric information from a user to authenticate that user and thereby determine whether the user should be granted access to an electronically controlled resource.

FIG. 2 shows a schematic functional block diagram of a user authentication apparatus 20 for authenticating users based on biometric information. The authentication apparatus is somewhat similar to the registration apparatus 10. In the illustrated example, like for the registration apparatus 10, the biometric information used for authentication is a voice print of the user gathered at a point of access to an electronically controlled resource 2. However, it will be understood that other biometric information could be used instead or as well, with suitable modifications of the apparatus 20.

The authentication apparatus 20 comprises a voice recording device 21 which gathers speech samples from a user. The voice recorder 21 is coupled to a processing module 22 which includes a register 23 for storing recorded speech samples from the voice recorder 21, an analysis module 24 for analyzing the stored speech samples, and a register 25 for storing/forwarding component vectors from the analyzed speech.

The authentication apparatus 20 also includes a processor 26 configurable as an artificial neural network similar or identical to neural network 16. Alternatively, other statistical classifiers could be incorporated instead of, or as well as, the artificial neural network with suitable modification of the authentication apparatus 20. An interface 28 is provided for communication with a user device 5, as discussed in connection with FIG. 1. The interface 28 may include a wired physical connection such as a USB socket or smart card chip connector. The interface 28 may alternatively or in addition include a wireless connection such as a Bluetooth, RFID, infra-red or WiFi transmitter and receiver. The interface may include any other digital information transfer mechanism, e.g. one using induction or magnetic information transfer such as a magnetic card reader. The authentication apparatus may also include a controller 29 for controlling the various functional blocks of the authentication apparatus and an information display 7 for providing output to a user.

A decision processor 8 is coupled to the neural network 26 to determine whether a user is authenticated or not.

The functionality of the registration apparatus and the authentication apparatus will now be described with reference to FIG. 3.

Registration Process

During registration, a user is requested to record a number of reference speech-input samples (box 31). In one example, the user is requested to repeat three samples using the same registration phrase such as a count of 1 to 9. These samples may be recorded and stored at any suitable quality level required by the circumstances; in a preferred embodiment, 8 kHz, 16-bit PCM way files are captured in register 13 using standard computer system library applications.

Analysis module 14 then converts the three way files into RAW file format from which n×13 component vectors are calculated (box 32) representing the energy and 12 mel frequency cepstral coefficients (MFCC) values of the reference speech sample using a Hamming window of 25 milliseconds. This gives approximately (350 to 450)×13 component input vectors depending on the actual length of the recorded reference speech inputs. Additional components could be included representing the first and second derivates of the energy and mel frequency cepstral coefficients if desired. This would produce a 39 component input vector per sample.

In a preferred embodiment, the analysis module 14 then time-aligns each of the three MFCC component files with transcriptions of the respective registration phrase sample utterances in order to identify the start and end positions of the voiced elements in each sample (e.g. the counts of 1 to 9). These start and end positions are used to select the three times nine sets of 13 component vectors that are to be used (box 33a) as positive training pattern inputs to nine multi-layer perceptron neural networks 16 (one neural network for each registration voiced element). Each neural network is then separately trained using conventional back-propagation methods with a momentum training algorithm to produce a target output of 1.0 at the outputs of each of the nine neural network 16. Thus, the neural network may generally comprise multiple neural networks.

The negative training patterns used during neural network training (box 33b) consist of three times nine equivalent sets of 13 component vectors that are derived from speech samples generated from users other than the user being registered. These negative training patterns have a target output of 0.1 from each of the nine neural networks 16. These speech samples generated from other users could form a pre-stored library used by the registration apparatus 10, for example pre-stored in register 13. In general, the training methods for the neural networks (weight set training) described herein may be referred to as model-based, including positive (registered user) and negative (impostor) biometric sample weight set training method (which may be distinguished from template-based neural networks).

The positive and negative training patterns generate a set of weights (box 34) for the neurons in the neural network 16 or each of the nine neural networks as received by register 17. In a general aspect, this set of weights can be considered as a first data set that is derived from a biometric attribute of a reference user. The set of weights may comprise multiple sets of weights, e.g. for each of the multiple neural networks, nine in the example above. The set of weights is then stored (box 36) on the user device 5. In a preferred arrangement, the set of weights is encrypted (box 35) before storing on the user device 5, for example using an RSA encryption algorithm. While RSA encryption is the preferred method, other less powerful encryption algorithms could be used.

In another embodiment, four weight sets corresponding to the four out of nine neural networks that give the best training performance are stored. The use of only the four best performing networks is advantageous in that it reduces the memory requirements for the user device 5 and also reduces the authentication processing time (to be described below) for any given processing capacity of hardware. It will be understood that the selection of four best performing networks out of a total of nine is but one preferred embodiment and other numbers of networks may be used for selection.

Thus, in a general aspect, the registration apparatus 10 exemplifies a means adapted to obtain a reference data sample representative of a biometric attribute of a reference user, e.g. a speech sample or vector components thereof. The reference data sample is used to generate the set of positive training pattern inputs to a reference neural network as exemplified by neural network processor 16. The registration apparatus 10 also exemplifies a means adapted to obtain a differentiating data sample representative of the same biometric attribute of one or more other users, e.g. voice prints of many other users pre-stored in the apparatus. The differentiating data sample is used to generate the set of negative training pattern inputs.

Identity Authentication

During an identity authentication process, the user under test for authentication provides his or her token or device 5 which is physically or wirelessly connected to the authentication apparatus via the interface 28. The encrypted or unencrypted weight set is transferred (box 41) to the authentication apparatus 20. This weight set is decrypted if necessary (box 42) and then used to populate the neural network 26 (box 43). The weight set may comprise multiple weight sets for multiple neural networks, as discussed in connection with the registration process above.

The user under test for authentication is required to speak a prescribed input phrase for authentication purposes (box 44). The prescribed phrase may be the same as that used during registration (e.g. a count of 1 to 9) or may be any other phrase that contains selected voiced elements from the registration phrase (e.g. a four digit number). This prescribed authentication phrase is captured into register 23 as an 8 kHz, 16-bit PCM audio file, in a similar manner to that used during the registration process. Analysis module 24 then calculates (box 45) a corresponding set of n×13 component vectors of this authentication or test speech sample which is time-aligned and segmented into 13 component vector sets corresponding to the number of voiced elements in the authentication phrase. These are presented (box 46) to the respective neural network 26 inputs after they have been configured or trained (box 43) using the weight set from the user device 5. In a preferred arrangement, the four vector sets corresponding to the equivalent four word vector sets stored on the user device are used. In a general aspect, the component vectors can be considered as a second data set representative of the biometric attribute of a test user to be authenticated.

The outputs of the neural network or neural networks then provide an indication of the degree of correlation between the user test input speech sample received from the voice recorder 21 and the previously registered input speech sample received by voice recorder 11 of the registration apparatus 10. In other words, the neural network 26 provides an output from which can be determined a degree of correlation between the biometric attribute of the reference user and the biometric attribute of the test user to be authenticated. In the embodiments described above with multiple neural networks, the neural networks 26 each provide an output and the outputs are averaged to produce a final output that represents the degree of correlation between the biometric attribute of the reference user and the biometric attribute of the test user to be authenticated.

The degree of correlation may be used by decision processor 8 to compare against predetermined threshold levels to make a positive or negative determination about the authenticity of the user under test (box 47).

In a general aspect, the first data set comprises a set of neural network weights adapted to cause the neural network to provide a first target output (e.g. 1.0) when the network is presented with an input representative of the biometric attribute of the reference user and adapted to provide a second target output (e.g. 0.1) different from the first target output when the network is presented with an input representative of the biometric attribute of a user (or preferably an average of many users) other than the reference user.

Successful authentication of a test user as a registered user allows the authentication device to then enable access to the resource 2. If the test is unsuccessful, then the authentication device causes access to the resource 2 to be denied.

The resource 2 may be any suitable electronically controlled resource, including a computer system, a computer process or application executing on a system such as a financial transaction, a physically accessible area such as a building controlled by, for example an electronic lock, to name but a few.

A preferred embodiment has been described in connection with use of voice prints as biometric data identifying an individual. However, it will be recognized that biometric information such as iris scans, fingerprints and any other electronically readable biological attribute can be used to generate a first data set corresponding to a weight set derived from training a neural network, and which biometric information can then be re-read from the individual by an authentication apparatus to use as input to a neural network programmed with the weight set.

A preferred embodiment has been described in which the data processing for the authentication is carried out by a separate apparatus 20 from the user device 5 by transferring the weight set of data (first data set) from the user device 5 to the authentication device 20. It will be recognized that the data processing could be carried out by the user device 5 by providing the neural network 26 on the user device and transferring the test sample data (the second data set) from the authentication apparatus 20 to the user device 5 for processing.

The system described above does not require a central repository of biometric information for authorized or registered individuals. Such a system can reduce the cost of implementation and allow users to retain control of their biometric information. The weight set generated by neural network 16 in register 17 can be deleted as soon as it is transferred to user device 5 and does not need to be retained in the registration apparatus. The way in which the weight set is produced remains a secret of the system provider, and is programmed into the registration apparatus 10 under the control of the system provider. Without knowledge of the process (neural architecture, training set, etc.) the decoding of the information on the user device 5 would be impossible or technically unfeasible. Reverse engineering of the process would also be extremely difficult as without the registration user voice print, knowledge of any given weight set would provide little or no indication of the weight set production process. Thus a lost user device is useless to a third party unless they can also provide a real time voice print or other biometric information at the point of access/authentication. Similarly, cloning of a user device is also worthless for the same reason.

Until the point of presentation of a user device or token at an access point, each access point only has an empty neural network. The network is only configured at the time of use by the weight set from the user device and nothing needs to be retrieved from a database of registered users. As discussed in specific examples above, the neural network may comprise multiple neural networks and the weight set may comprise multiple weights sets each corresponding to a one of the neural networks.

Also as discussed above, a neural network can be replaced with any other suitable form of statistical classifier, for example a Support Vector Machine (SVM) among others.

Other embodiments are intentionally within the scope of the accompanying claims. When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of biometric authentication of a test user in an authentication device, the method comprising:

obtaining in the authentication device, at a time of authentication, a test sample data set representative of one or more biometric attributes of the test user, wherein prior to the time of authentication the authentication device includes a plurality of untrained artificial neural networks;

receiving in the authentication device a first data set from a user device at the time of authentication, wherein the first data set is derived from one or more biometric attributes of a reference user and is stored in the user device, further wherein the first data set comprises multiple weight sets with each weight set corresponding to one element of the one or more biometric attributes of the reference user;

using the first data set as a set of weights for the untrained neural networks in the authentication device to generate trained neural networks at the time of authentication;

providing the test sample data set as inputs to the trained neural networks;

determining, from outputs of the trained neural networks corresponding to the inputs, a degree of correlation between the one or more biometric attributes of the reference user and the one or more biometric attributes of the test user; and authenticating the test user if the degree of correlation exceeds a threshold.

2. The method of claim 1, wherein the user device is a mobile telephone.

3. The method of claim 1, wherein the authentication device comprises a mobile phone.

4. The method of claim 1, wherein the first data set comprises sets of neural network weights adapted to cause a respective one of the neural networks to provide a first target output when the respective neural network is presented with an input representative of the one or more biometric attributes of the reference user and adapted to provide a second target output different from the first target output when the neural network is presented with an input representative of the one or more biometric attributes of a user other than the reference user.

5. The method of claim 1, wherein the first data set stored on the user device is encrypted, and wherein using the first data set comprises decrypting the first data set prior to using it.

6. The method of claim 1, further comprising storing the first data set in the user device.

7. The method of claim 1, wherein the one or more biometric attributes of the test user comprises one or more of: a voice print of the test user, a fingerprint of the test user, an image of the test user.

8. The method of claim 1, wherein the one or more biometric attributes of the test user comprises a two or more of: a voice print of the test user, a fingerprint of the test user, an image of the test user.

9. The method of claim 1, wherein obtaining the test sample data set comprises: obtaining a biometric input from the test user; determining a plurality of component vectors of the biometric input; and using the plurality of component vectors as the test sample data set.

10. The method of claim 1, wherein the obtaining the test sample data set comprises: obtaining one or more of a speech input from the test user, a fingerprint from the test user, and an image of the test user; determining a plurality of component vectors from the obtained one or more of the speech input from the test user, fingerprint from the test user, and image of the test user; and using the plurality of component vectors as the test sample data set.

11. The method of claim 1, wherein authenticating the test user comprises authenticating the test user as the reference user if an average, or weighted average, of the trained neural network outputs reaches a predetermined threshold level.

12. The method of claim 1, wherein authenticating the test user comprises authenticating the test user as the reference user if each trained neural network output reaches a predetermined threshold level.

13. The method of claim 1, further comprising registering the reference user by:
obtaining a reference data sample representative of the one or more biometric attributes of the reference user;
obtaining a differentiating data sample representative of one or more biometric attributes of one or more persons different from the reference user;
using the reference data sample to generate a set of positive training pattern inputs to a set of reference neural networks to achieve a first target output;
using the differentiating data sample to generate a set of negative training pattern inputs to the set of reference neural networks to achieve a second target output; and
determining the first data set as the sets of weights from the set of reference neural networks that achieve the first and second target outputs.

14. The method of claim 1 further wherein the user device is a portable user device and wherein the authentication device is coupled to an electronically controlled resource to which the test user may be granted or refused access on the basis of the degree of correlation determined.

15. An authentication device for providing biometric authentication of a test user at a time of authentication, the device comprising:
a first input configured to receive, at the time of authentication, a first data set from a user device that is separable from the authentication device, the first data set derived from a biometric attribute of a reference user, wherein the first data set comprises multiple weight sets with each weight set corresponding to a respective neural network and each weight set corresponding to one element of the biometric attribute;
a second input configured to receive, at the time of authentication, a test sample data set representative of a biometric attribute of the test user;
a processor configured as a plurality of untrained artificial neural networks, the processor adapted to receive the first data set and program the untrained neural networks with the first data set as a set of weights for the untrained neural networks to generate trained neural networks;
the processor being further adapted to receive the test sample data set as input to the trained neural networks from the second input; and
a decision processor adapted to determine, from the outputs of the trained neural networks corresponding to the second input, a degree of correlation between the biometric attribute of the reference user and the biometric attribute of the test user and to authenticate the test user if the degree of correlation exceeds a threshold.

16. The authentication device of claim 15, wherein the user device is a mobile telephone.

17. The authentication device of claim 15 configured as a mobile phone.

18. The authentication device of claim 15, wherein the first data set comprises a set of neural network weights adapted to cause a respective one of the neural networks to provide a first target output when the respective neural network is presented with an input representative of the biometric attribute of the reference user and adapted to provide a second target output different from the first target output when the neural network is presented with an input that is not representative of the biometric attribute of the reference user.

19. The authentication device of claim 15, further wherein the processor is configured to decrypt the first data set prior to using it as the sets of weights in the untrained artificial neural networks.

20. The authentication device of claim 15, wherein the biometric attributes of the test user comprises one or more of: a voice print of the test user, a fingerprint of the test user, an image of the test user.

21. The authentication device of claim 15, wherein the biometric attribute of the test user is a voice print of a test user and the second input is a voice recorder configured to obtaining a speech input from the test user; further wherein the second input comprises a voice processor configured to determine a number of component vectors of the speech input and providing the component vectors as the second data set.

22. The authentication device of claim 15, wherein the decision processor is adapted to authenticate the test user as the reference user if an average of the trained neural networks outputs reaches a predetermined threshold level.

23. The authentication device of claim 15, wherein the decision processor is adapted to authenticate the test user as the reference user if each trained neural network output reaches a predetermined threshold level.

24. The authentication device of claim 15, wherein the first input is adapted to receive the first data set from the user device wherein the user device is connectable to the authentication device and the second input is adapted to receive the second data set from a user input device.

25. The authentication device of claim 15, wherein the user device is a portable user device configured to read a biometric attribute of a human body.

26. The authentication device of claim 15, wherein the user device comprises a voice recorder, a fingerprint scanner or a camera.

27. The authentication device of claim 15, further comprising a registration apparatus for registering the reference user, comprising:

a registration input configured to obtain a reference data sample representative of the biometric attribute of the reference user;

a registration processor adapted to obtain a differentiating data sample representative of a biometric attribute of one or more persons different from the reference user;

wherein the registration processor is adapted to use the reference data sample to generate a set of positive training pattern inputs to a set of reference neural networks to achieve a first target output;

further wherein the registration processor is adapted to use the differentiating data sample to generate a set of negative training pattern inputs to the set of reference neural networks to achieve a second target output; and wherein the registration processor is adapted to determine the first data set as the sets of weights from the set of reference neural networks that achieve the first and second target outputs.

28. The authentication device of claim 15, further comprising: an electronically controlled resource coupled to decision processor, wherein the test user may be granted or refused access to the electronically controlled resource based on the degree of correlation determined by the decision processor.

29. A method of biometric authentication of a test user in an authentication device, the method comprising:

obtaining in the authentication device, at a time of authentication, a test sample data set representative of one or more biometric attributes of the test user, wherein prior to the time of authentication the authentication device includes a plurality of untrained artificial neural networks;

receiving in the authentication device an encrypted first data set from a user device at the time of authentication, wherein the first data set is derived from one or more biometric attributes of a reference user and is stored in the user device, further wherein the first data set comprises multiple weight sets with each weight set corresponding to one element of the biometric attribute of the reference user;

decrypting the first data set and using the decrypted first data set as a set of weights for the untrained neural networks in the authentication device to generate trained neural networks at the time of authentication;

inputting the test sample data set as inputs to the trained neural networks;

determining, from outputs of the trained neural networks' corresponding to the inputs, a degree of correlation between the one or more biometric attributes of the reference user and the one or more biometric attributes of the test user; and authenticating the test user if the degree of correlation exceeds a threshold.

* * * * *